Patented Sept. 2, 1941

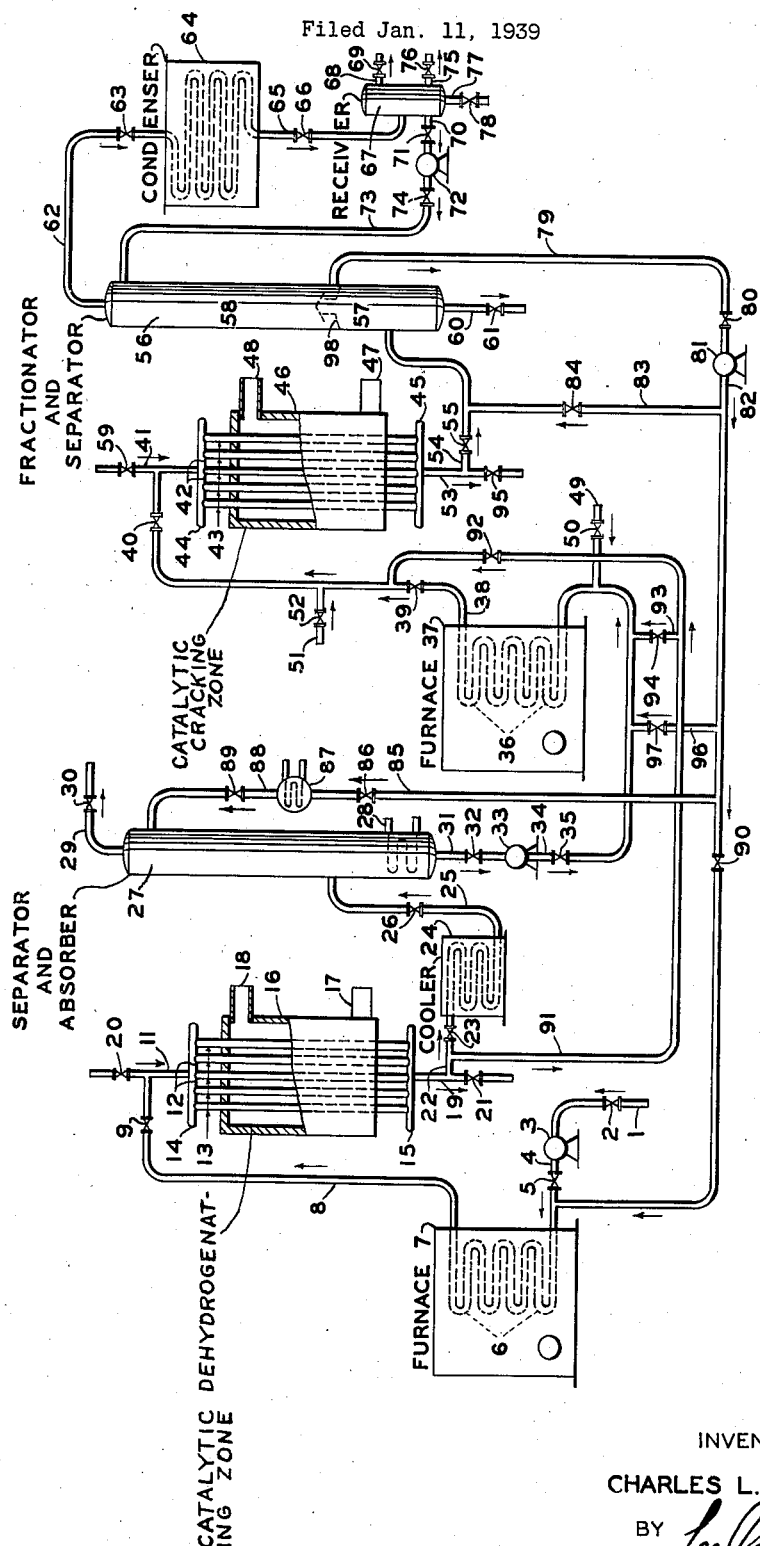

2,254,553

UNITED STATES PATENT OFFICE 2,254,553

CATALYTIC TREATMENT OF HYDROCARBONS

Charles L. Thomas, Chicago, Ill., assignor to Universal Oil Products Company, Chicago, Ill., a corporation of Delaware Application January 11, 1939, Serial No. 250,327

4 Claims. (Cl. 196—49)

This invention relates particularly to the catalytic treatment of hydrocarbon oils and is more specifically concerned with a process for converting hydrocarbon oil into optimum yields of high antiknock gasoline and relatively higher yields of gases relatively rich in olefins by catalytic treatment in a multiple stage process.

The invention provides for dehydrogenating the hydrocarbon charging stock in the presence of a suitable catalyst to produce substantial quantities of liquid olefinic hydrocarbons followed by catalytic cracking of the resulting liquid products. This stepwise process, as briefly outlined above, has many outstanding advantages, as compared with straight catalytic cracking not preceded by dehydrogenation, a few of which are enumerated below. First the catalytic cracking reaction may be carried out at lower temperatures because liquid olefins are more readily cracked than either paraffinic or aromatic oils. Secondly, there is less deposition of carbon on the catalyst because of the lower temperatures employed and therefore, longer periods of operation may be employed before reactivating the catalyst which is desirable from an economical as well as from an operating standpoint. In addition, the characteristic advantages of catalytic cracking, with respect to the production of high octane gasoline and valuable gases of high olefin and high hydrogen content, are obtained. Still another advantage of this process lies in the fact that the lower temperature employed in the catalytic reaction conforms more closely to the desired conditions necessary for obtaining a greater degree of isomerization of the cracked products with a corresponding increase in octane number.

Within the broad concepts of this invention dehyrogenation refers to the breaking of carbon-to-hydrogen bonds resulting in the splitting off of hydrogen from the molecule and the formation of a molecule containing a double bond, such as, for example, olefins from paraffinic hydrocarbons, whereas catalytic cracking refers to the breaking of the carbon-to-carbon bond resulting in the formation of two or more molecules of lighter hydrocarbons than the original.

In one specific embodiment the present invention comprises subjecting vaporized hydrocarbon charging stock to contact with a suitable dehydrogenating catalyst under the selected conditions of temperature and pressure in a primary step, separating fixed gases from the dehydrogenated products, subjecting said dehydrogenated products in the vapor state to contact with a suitable cracking catalyst under selected conditions of temperature and pressure in the second step, introducing the conversion products from said second step to a separator whereby to separate liquid residue from vaporous components, removing and recovering said liquid residue as a product of the process, subjecting said vaporous components to fractionation to separate fractionated vapors of the desired end boiling point from the heavier hydrocarbons whose average boiling point is above that of the fractionated vapors, condensing and recovering said fractionated vapors as a product of the process, condensing said heavier hydrocarbons in the fractionating zone as reflux condensate, and returning the reflux condensate in part to said primary step and in part to said second step.

The outline of the process given in the preceding paragraph will be amplified in the following description to indicate its important features in greater detail by describing characteristic operations in connection with the attached diagrammatic drawing. The drawing illustrates one specific form of apparatus in which the process of the invention may be conducted. It is not drawn to any absolute or relative scale and the design and relative sizes of the individual units may be varied within reasonably wide ranges without departing from the broad scope of the invention.

Referring to the drawing, charging stock for the process preferably comprising a hydrocarbon oil boiling above gasoline, is introduced through line 1 containing valve 2 to pump 3 which discharges through line 4 containing valve 5 into heating coil 6. The oil in passing through coil 6 is substantially completely vaporized therein and raised to the desired temperature by means of heat supplied from a suitable furnace 7. In order to suppress the pyrolytic cracking reaction, when vaporizing the charging stock, it is preferred that relatively short heating times be employed in heating coil 6 and relatively high heat input rates. The vaporized charging stock is discharged from heating coil 6 through line 8 and is directed through valve 9 and line 11 to catalytic reactor 12.

In the case here illustrated, catalytic reactor 12 comprises a plurality of small diameter reactor tubes 13 connected in parallel between upper and lower headers 14 and 15 and is disposed within a fluid heating or cooling zone 16. Since catalytic dehydrogenation is endothermic, heat must be supplied to zone 16 in order to carry out the reaction under optimum temperature conditions.

Fluid heating means, preferably comprising hot combustion gases, are employed as this source of heat in zone 16. In this case the hot combustion gases are introduced to zone 16 through duct 17, passed in indirect heat exchange relationship with the vapors passing through reactor tubes 13, and after giving up their heat are discharged therefrom through duct 18.

In catalytic processes, such as dehydrogenation and catalytic cracking, the deposition of carbon on the catalyst is relatively rapid and this tends to decrease the activity of the catalyst. In order to obtain best results relatively short periods of operation are employed; i. e., the catalyst is subjected to contact with process vapors for a relatively short time and is then reactivated for the same length of time. In this case it is preferred that a plurality of reactors be employed, each disposed within a separate fluid heating or cooling zone, and in order to make the operation continuous, the reactivation may be accomplished in some of the reactors while the others are processing.

Although I have found it advantageous to employ a reactor of the type described above, various other kinds of reactors, such as, for example, the chamber type, may be employed without departing from the broad scope of the invention.

The hydrocarbon vapors introduced to reactor 12 through line 11 are contacted therein with a suitable dehydrogenating catalyst under selected conditions of temperature and pressure. The resulting dehydrogenated products are discharged from reactor 12 through line 19 and treated as subsequently described.

The catalysts preferably employed are of a special character which have been found to be highly efficient in the catalytic dehydrogenation of hydrocarbon oil vapors to produce optimum yields of olefinic liquid hydrocarbons. The preferred catalysts for effecting dehydrogenation are the catalysts consisting of activated aluminum oxide supporting about 20% or less of chromium sesquioxide. Such catalysts are preferably produced by the deposition of chromium trioxide or its salt, or salts of trivalent chromium salts such as chromium nitrate, $Cr(NO_3)_3$, or by the precipitation of chromium trihydroxide, $$Cr(OH)_3$$

upon alumina granules.

While the present process has been found to operate very effectively in dehydrogenating hydrocarbon oils when employing an alumina chromia catalyst, the process is not limited to this particular composition of catalyst but may employ other composite catalysts of a refractory character, such as, for example, alumina supporting compounds and preferably oxides selected from the group comprising compounds and oxides of the elements in the left hand columns of groups 4, 5 and 6 in the periodic table or silica or any inert refractory material supporting the compounds or metal oxides, mentioned above. The catalysts which are alternately utilizable are not exactly equivalent in their reaction and are not to be considered as absolute substitutes one for the other. This fact will be more or less apparent to those conversant with the practical aspect of catalysis.

In the particular case here illustrated, when the catalyst is reactivated the flow of hydrocarbon vapors is stopped and suitable reactivating gases at an elevated temperature containing regulated quantities of oxygen are introduced through line 11 and directed through valve 20 to catalytic reactor 12. The reactivating gases pass through reactor tubes 13 and due to oxidation the carbon deposited upon the catalyst disposed therein is caused to burn and the resulting gases are discharged from reactor 12 through line 19 and are directed through valve 21 and recirculated or discharged to the atmosphere as desired. When reactivating the catalyst the reactivation that takes place is exothermic and suitable means must be employed to dissipate the heat. In this case it is preferred to employ cooled combustion gases which are supplied to zone 16 through duct 17 and are passed in indirect exchange relationship with the flow of reactivating gases in the reactor tubes and are discharged therefrom through duct 18.

The dehydrogenated products in line 19 are preferably directed through line 22 and valve 23 to cooler 24 wherein they are cooled to a temperature at which the thermal cracking reaction is substantially arrested. The cooled dehydrogenated products are discharged from cooler 24 through line 25 and are directed through valve 26 into separator and absorber 27. The dehydrogenated products introduced to separator and absorber 27 are preferably separated into a fraction substantially free of normally gaseous hydrocarbons and a fraction containing said normally gaseous hydrocarbons. This may be accomplished by introducing cooled reflux condensate to the upper portion of separator and absorber 27, from line 88, as subsequently described, and subjecting the bottoms to reboiling. In the particular case here illustrated, the reboiler coil 28 to which steam or some suitable heating medium is supplied, is used for reboiling liquids in the lower portion of vessel 27. However, various other forms of reboilers may be employed as would be apparent to those skilled in the art, and it is not intended that this invention should be limited to the particular form of apparatus herein described.

Although separator and absorber 27 is preferably operated to remove all of the normally gaseous hydrocarbons, it may be desirable at times to separate only hydrogen and methane, in which case the balance of the normally gaseous hydrocarbons would be incorporated into the liquid recovered as bottoms in this step. In any case the fixed gases separated in separator and absorber 27 are withdrawn from the upper portion thereof through line 29 and are directed through valve 30 to cooling and storage or elsewhere as desired. The liquid hydrocarbons collected in the lower portion of separator and absorber 27, comprising normally liquid hydrocarbons and, when desired, condensed and dissolved normally gaseous hydrocarbons, are withdrawn from the lower portion thereof through line 31 and are directed through valve 32 to pump 33 which discharges through line 34 containing valve 35 to heating coil 36.

It may be desirable at times to partly or completely by-pass separator and absorber 27, in which case the hot conversion products in line 22 may be directed all or in part through line 91 containing valve 92 into line 38. On the other hand, conversion products in line 40 may be below the desired reaction temperature, in which case at least a portion of the same is preferably subjected to heating in heating coil 36, and this may be accomplished by directing all or a portion of the conversion products in line 91 through line 93 containing valve 94 into line 34 by means of which they are introduced to heating coil 36.

The charge introduced to heating coil 36, comprising liquid conversion products and/or vaporous conversion products from the dehydrogenation step, are raised to the desired reaction temperature which preferably is sufficiently high to maintain all of the materials in the vapor state by means of heat supplied from a suitable furnace setting 37. The heated vapors are discharged from heating coil 36 through line 38 and are directed through valve 39, valve 40, and line 41 into reactor 42. Reactor 42 as illustrated in the accompanying diagrammatic drawing, comprises an apparatus of similar design to reactor 12. Briefly, it comprises a plurality of small diameter reactor tubes 43 connected in parallel between upper and lower headers 44 and 45 and is disposed within a fluid heating or cooling zone 46. Catalytic cracking being similar to dehydrogenation in many respects, it follows that the preferred method for heat exchange within reactor zone 46 is by fluid heating means which may be accomplished by introducing hot combustion gases through duct 47, passing the same in indirect heat exchange relationship with the vapors in reactor tubes 43, and discharging the cooler combustion gases through duct 48. As previously described, it is preferred that fluid cooling means be introduced to reactor zone 46 during the reactivation period, and this may be accomplished by utilizing the same means, as described above, for introduction and withdrawal of cooler combustion gases.

When desired, steam may be introduced with the charge to the catalytic reactor 42 in order to assist in vaporizing the charge and reducing the effective pressure on the hydrocarbon vapors. Steam is preferably introduced to the conversion products from the dehydrogenation step prior to their introduction into heating coil 36 through line 49 containing valve 50. On the other hand, in case heating coil 36 is not employed, relatively dry steam, superheated to the desired temperature may be introduced to the hydrocarbon vapors in line 38 through line 51 containing valve 52.

The hydrocarbon vapors introduced to header 44 of reactor 42 are contacted with a suitable cracking catalyst disposed within reactor tubes 43 under the optimum conditions of temperature and pressure and are discharged from reactor 42 through line 53, and are directed through line 54 containing valve 55, preferably cooled by introducing a suitable cooling medium, as subsequently described, in order to suppress any thermal cracking reaction, and are introduced to separating zone 57 within combined fractionator and separator 56.

The preferred catalysts which have been found to be highly efficient in the catalytic cracking of hydrocarbon vapors consist in general of uniform size pellets of specially prepared silica composited with alumina, the amount of the alumina being varied to suit requirements depending upon the stock to be treated and the operating conditions employed. As a rough average, good results are usually obtained, for example, when employing silica composited with 15% alumina. This alumina percentage is varied for best results under specific conditions over a relatively wide range, for example, from 2% to 50% or alumina may be employed as the major ingredient and the silica varied over substantially the same range as the alumina, i. e., 2%–50%. Catalysts of this character may be initially prepared in any of several different manners and subsequently dried. The preferred catalyst is prepared by precipitating silica hydrogel from a solution of sodium silicate by acidifying with an acid, such as hydrochloric acid, for example, subsequently treating and washing the silica hydrogel to remove substantially all of the alkali metal ions, suspending the purified silica gel in a solution of aluminum salts and depositing alumina hydrogel upon the suspended silica by the addition of volatile basic precipitants, such as, for example, ammonium hydroxide, ammonium carbonate and ammonium sulfide. After the alumina has been deposited upon the purified hydrated silica gel the material is dried, formed into pellets and calcined at a temperature of approximately 850 to 1000° F. Although the present process has been found to operate very effectively in catalytically cracking petroleum oils when employing a silica base catalyst supporting 15% alumina, the process is not limited to this particular type of catalyst but may employ other composite catalysts of a refractory character, such as, for example, silica supporting compounds of the group comprising zirconia, vanadia, alumina-zirconia, and alumina-thoria, and acid treated clays may also be employed. The catalysts referred to above are not exactly equivalent in their reaction and are not to be considered as absolute substitutes one for the other, which fact will be more or less apparent to those skilled in the art.

As previously mentioned, in catalytic cracking and dehydrogenation carbon deposits upon the catalyst at a relatively rapid rate, and it is necessary that the catalyst be reactivated at relatively frequent intervals. Therefore in this case as in the previous case, it is preferred that a plurality of reactors be employed, each disposed within a separate fluid heating or cooling zone in order that they may be separately used in processing and be reactivated. In this case, reactivating gases at an elevated temperature and containing regulated quantities of oxygen are introduced through line 41 and directed through valve 59 into reactor 42. The carbon deposited upon the catalyst disposed within reactor tubes 43 is caused to burn by oxidation with the air introduced within the reactivating gases. The resulting gases are discharged from reactor 42 through line 53 and are directed through valve 95 and recirculated or discharged to the atmosphere as desired. In order to dissipate the heat evolved during the reactivation, suitable cooling means is supplied through duct 47, passed in indirect heat exchange relationship with the flow of reactivating gases in the reactor and are finally discharged therefrom through duct 48.

Preferably and as illustrated in the accompanying drawing, vessel 56 comprises a separating zone 57 in its lower portion and a fractionating zone 58 separated from said separating zone by means of reflux trapout tray 98. However, other means may be employed to accomplish the same purpose such as, for example, separate vessels.

The commingled materials in line 54 are subjected to separation in zone 57 wherein the residual liquids are separated from vaporous components. The residual liquids are discharged from the lower portion of zone 57 through line 60 and are directed through valve 61 to cooling and storage or elsewhere as desired. The vaporous components are introduced to fractionating zone 58 in combined separator and fractionator 56 wherein fractionated vapors in the gasoline boiling range are separated from higher boiling hydrocarbons.

Fractionated vapors of the desired end boiling point are withdrawn from the upper portion of fractionating zone 58 through line 62 and are directed through valve 63 to cooler and condenser 64. The resulting gas-containing distillate, together with undissolved and uncondensed gases discharged from condenser 64, are directed through line 65 and valve 66 to receiver 67.

Undissolved and uncondensed gases collected and separated in receiver 67 are discharged from the upper portion thereof through line 68 and are directed through valve 69 to collection and storage or elsewhere as desired. Regulated portions of the distillate collected in receiver 67 are directed through line 70 containing valve 71 to pump 72 from which they are discharged through line 73 containing valve 74 into the upper portion of fractionating zone 58 for refluxing and cooling therein. The remaining distillate collected in receiver 67 is withdrawn from the lower portion thereof through line 75 and is directed through valve 76 to stabilization and subsequent storage or elsewhere as desired. Water collected in the lower portion of receiver 67 resulting from condensing the steam employed in the process is withdrawn therefrom through line 77 and valve 78.

The heavier hydrocarbons separated from the fractionated vapors, comprising a fraction whose average boiling point is above that of said fractionated vapors, are condensed as reflux condensate in fractionating zone 58. The reflux condensate collected on trapout tray 98 in the lower portion of fractionating zone 58 is discharged therefrom through line 79 and is directed through valve 80 to pump 81. Pump 81 discharges through line 82 and a portion of the reflux condensate in line 82 is directed through line 83 containing valve 84 and commingled with the catalytic conversion products in line 54 to cool the same in order to arrest the thermal cracking reaction, as previously described. The balance of the reflux condensate in line 82 may be directed all or in part through line 85 containing valve 86 to sub-cooler 87. The cooler reflux condensate is discharged from said sub-cooler 87 through line 88 containing valve 89 into the upper portion of separator and absorber 27 to act as an absorption medium, as previously described. As an alternative, instead of introducing reflux condensate to conversion in the second step as an absorption oil, all or a portion of the reflux condensate subjected to conversion in the second step may be introduced to heating coil 36 by way of line 82, line 96, valve 97, and line 34. A portion of the reflux condensate in line 82 may, when desired, be directed through valve 90 for subsequent treatment in commingled state with the charging oil introduced to heating coil 6.

The preferred range of operating conditions which may be employed in an apparatus such as illustrated and above described to accomplish the desired results is approximately as follows:

The heater to which the charging stock is supplied may employ an outlet temperature ranging, for example, from 800 to 1200° F. and a superatmospheric pressure of from 20 to 100 pounds or more per square inch. Substantially the same conditions of temperature and pressure are maintained on the process vapors introduced to the catalytic dehydrogenation reactor as are employed on the outlet of the heating coil to which the charging stock is supplied. The separator and absorber may employ a superatmospheric pressure substantially the same as that on the outlet of the catalytic dehydrogenation reactor. The furnace to which the dehydrogenated products are introduced may employ an outlet temperature ranging, for example, from 800 to 1200° F. and a superatmospheric pressure of from 20 to 100 pounds or more per square inch; however, this process permits the utilization of lower temperatures than would otherwise be employed if the cracking step was not preceded by the dehydrogenation step. Substantially the same conditions of temperature and pressure may be utilized on the process vapors introduced to and passed through the catalytic cracking reactor as are employed on the outlet of the heating coil to which the dehydrogenated products are supplied. The conversion products discharged from the catalytic cracking reactor are preferably cooled to a temperature ranging, for example, from 600 to 800° F. or at least a sufficiently low temperature to substantially arrest any thermal cracking reaction. The combined fractionator and separator may utilize a pressure substantially the same as that employed at the outlet of the catalytic cracking reactor.

As an example of one specific operation of the process as it may be accomplished in an apparatus such as illustrated and above described, the charging stock comprising a 36.7° A. P. I. gravity Mid-continent gas-oil was subjected to contact in the vapor state with an alumina-chromia dehydrogenating catalyst at a temperature of approximately 932° F. and under a superatmospheric pressure of approximately 25 pounds per square inch. The dehydrogenated products were treated for the removal of fixed gases and the resulting dehydrogenated products subjected to contact in the vapor state with a silica-alumina catalyst at a temperature of approximately 900° F. and under a superatmospheric pressure of approximately 30 pounds per square inch. The conversion products were cooled to approximately 650° F. by commingling reflux condensate produced as hereinafter described with the same. The conversion products, together with the cooling oil, were subjected to separation for the removal of liquid residue and the vaporous materials subjected to fractionation to separate gasoline from the heavier hydrocarbons. The gasoline was recovered from the fractionator as a product of the process and the heavier hydrocarbons were condensed as reflux condensate within the fractionator. A portion of the reflux condensate was introduced as cooling oil to the conversion products discharged from the catalytic cracking step and a portion as absorption oil to the gas separation step following the dehydrogenation reaction. This operation yielded approximately 68% of 81 octane number gasoline by volume of the charge with a gas production of approximately 780 cubic feet per barrel of charge.

I claim as my invention:

1. A process for the conversion of hydrocarbon oils heavier than gasoline which comprises contacting the charging oil with a dehydrogenating catalyst under conditions suitable for the conversion of paraffins contained in the oil into normally liquid olefins, and thereafter contacting said olefins with a cracking catalyst at a temperature adequate to produce lower boiling hydrocarbons therefrom but below the optimum cracking temperature of said charging oil when using the same cracking catalyst.

2. A process for the conversion of hydrocarbon oils heavier than gasoline which comprises contacting the charging oil with a dehydrogenating catalyst under conditions suitable for the conversion of paraffins contained in the oil into normally liquid olefins, separating said olefins from normally gaseous products of the dehydrogenation, and catalytically cracking the normally liquid olefins at a temperature below the optimum cracking temperature of said charging oil when using the same cracking catalyst, whereby to produce lower boiling hydrocarbons from said olefins.

3. A process for the conversion of hydrocarbon oils heavier than gasoline which comprises contacting the charging oil with an alumina-chromia catalyst under conditions suitable for the conversion of paraffins contained in the oil into normally liquid olefins, and thereafter contacting said olefins with a silica-alumina catalyst at a temperature adequate to produce lower boiling hydrocarbons therefrom but below the optimum cracking temperature of said charging oil when using the same cracking catalyst.

4. A process for the conversion of hydrocarbon oils heavier than gasoline which comprises contacting the charging oil with an alumina-chromia catalyst under conditions suitable for the conversion of paraffins contained in the oil into normally liquid olefins, separating said olefins from normally gaseous products, and cracking the normally liquid olefins in the presence of a silica-alumina catalyst at a temperature below the optimum cracking temperature of said charging oil when using the same cracking catalyst, whereby to produce lower boiling hydrocarbons from said olefins.

CHARLES L. THOMAS.